J. A. HILL.
MOTOR VEHICLE.
APPLICATION FILED MAR. 13, 1914.

1,131,781.

Patented Mar. 16, 1915.
3 SHEETS—SHEET 1.

J. A. HILL.
MOTOR VEHICLE.
APPLICATION FILED MAR. 13, 1914.

1,131,781.

Patented Mar. 16, 1915.
3 SHEETS—SHEET 2.

Witnesses
Arthur F. Draper
Anna M. Dore

Inventor
Joshua A. Hill

By
Barthel & Barthel
Attorneys

J. A. HILL.
MOTOR VEHICLE.
APPLICATION FILED MAR. 13, 1914.

1,131,781.

Patented Mar. 16, 1915.
3 SHEETS—SHEET 3.

Witnesses
Arthur F. Draper
Anna M. Dorr

Inventor
Joshua A. Hill
By Bartlett & Bartlett
Attorneys ically sealed chamber just forward of the crank shaft bearing; but this is not essential to the invention.

UNITED STATES PATENT OFFICE.

JOSHUA A. HILL, OF ESSEX, ONTARIO, CANADA.

MOTOR-VEHICLE.

1,131,781. Specification of Letters Patent. Patented Mar. 16, 1915.

Application filed March 13, 1914. Serial No. 824,349.

*To all whom it may concern:*

Be it known that I, JOSHUA A. HILL, a subject of the King of England, residing at Essex, in the county of Essex and Province of Ontario, Canada, have invented certain new and useful Improvements in Motor-Vehicles, of which the following is a specification, reference being had therein to the accompanying drawings.

This invention relates to improvements in motor driven vehicles and more particularly to vehicles of the motor cycle, tricycle or cycle car type.

One of the objects of the invention is to provide a strong resilient frame construction and arrangement of motor thereon whereby a low center of gravity is secured and efficient cooling of the motor insured.

A further object is to secure a compact arrangement of parts presenting a neat appearance and having provision for the housing of the moving parts of the motor and its adjuncts.

It is also an object of the invention to provide an arrangement of frame and motor whereby an even distribution of weight is secured and the frame forms a guide to protect the motor against injury should the vehicle tip over.

With these and other ends in view the invention consists in the matters hereinafter set forth and more particularly pointed out in the appended claims reference being had to the accompanying drawings, in which—

Figure 1:
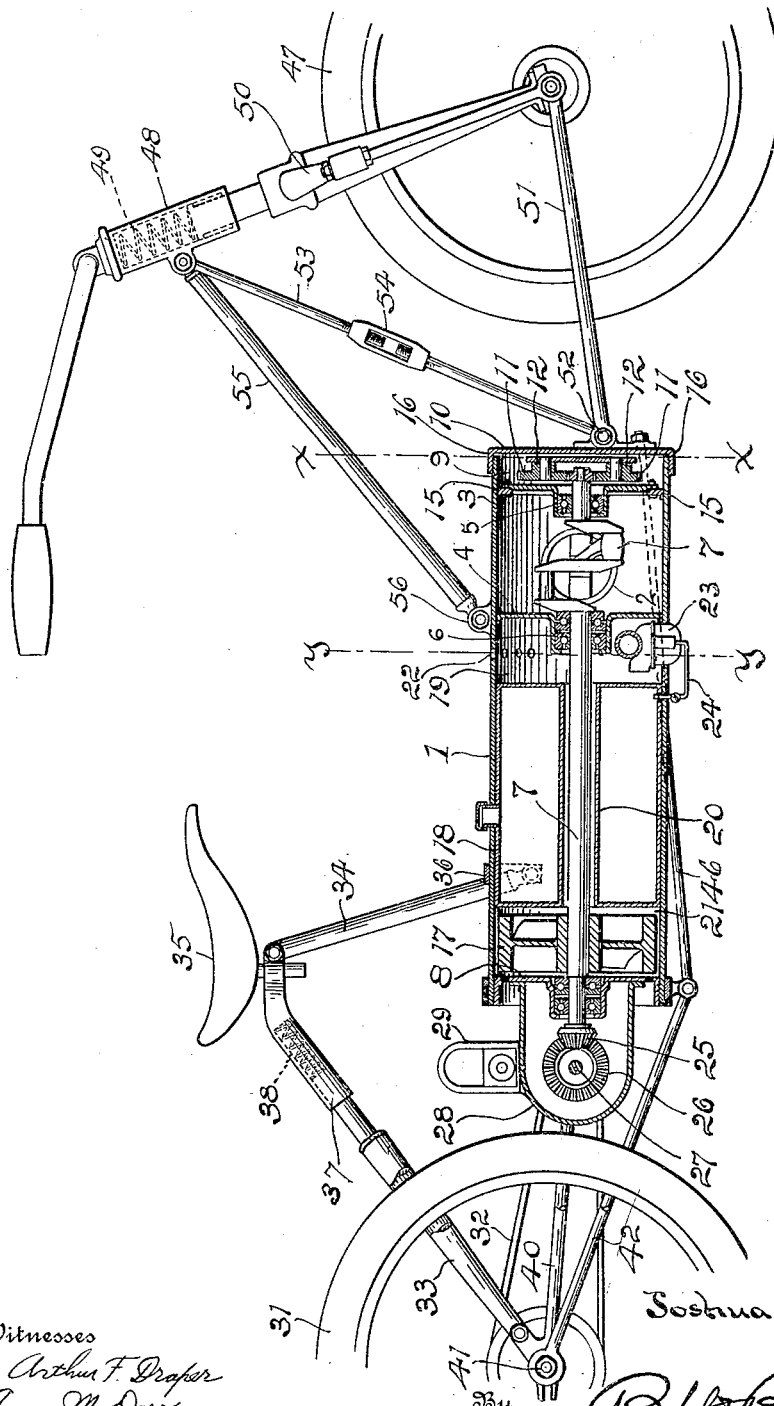
Figure 2:
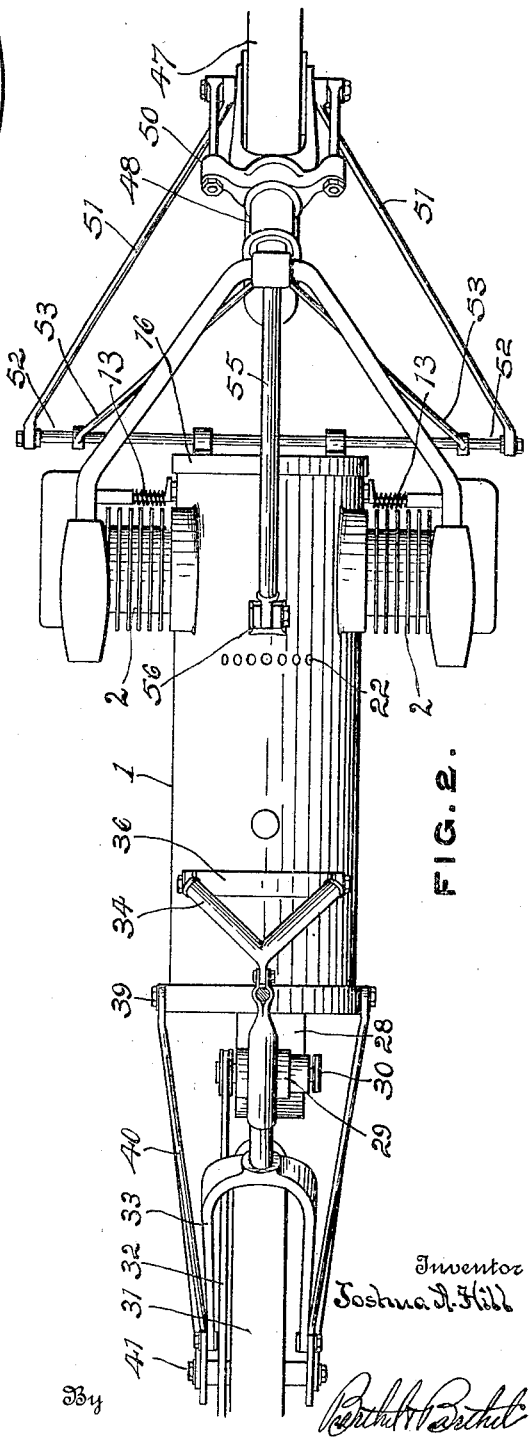
Figure 3:
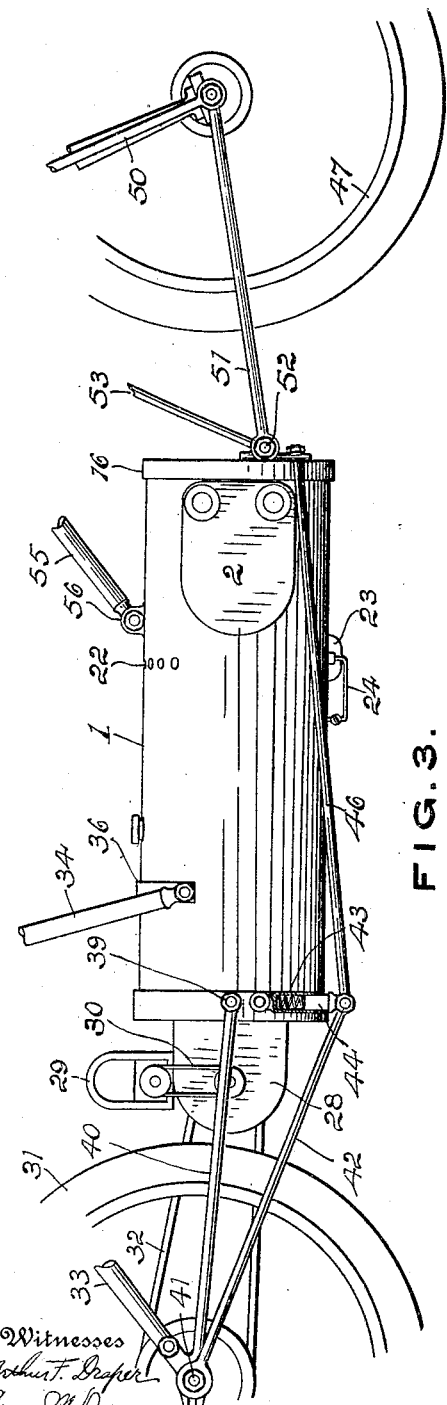
Figure 4:
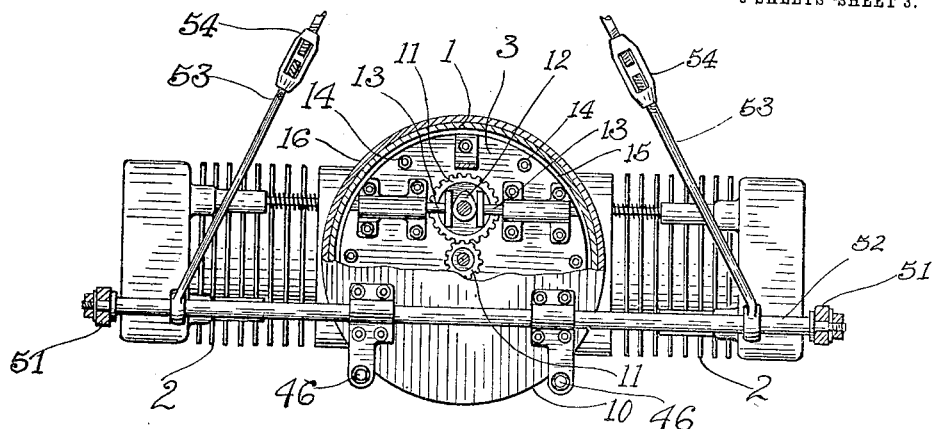
Figure 5:
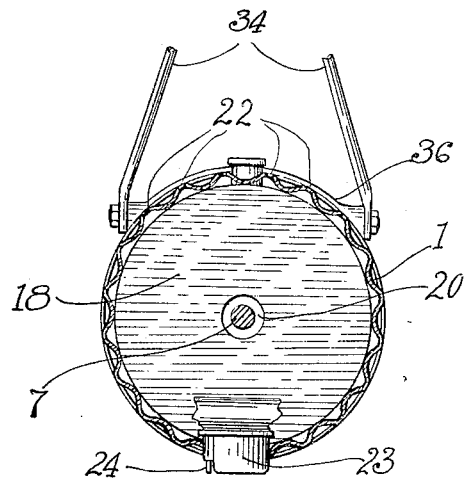

Figure 1 is a longitudinal vertical section through a machine embodying the invention; Fig. 2 is a plan view of the same; Fig. 3 is a detail showing a partial side elevation; Fig. 4 is a cross sectional view of the machine, partly in elevation, taken on or about the line *x—x* of Fig. 1; Fig. 5 is an enlarged transverse section on the line *y—y* of Fig. 1 and showing a modification of the construction.

For convenience of illustration the invention is shown as applied to a two wheeled motor vehicle or motor cycle but it will be understood that it may be applied as well to vehicles having three or four wheels.

In the drawings, 1 indicates a tubular body preferably of thin steel tubing having secured thereto in any suitable manner near its forward end, a pair of engine cylinders 2, these cylinders being disposed at right angles to each other and extending laterally from the sides of the body which forms a crank case for the engine by being provided with transverse partitions 3 and 4 having bearings 5 and 6 for a crank shaft 7 of the engine positioned in the longitudinal axis of the body. The rear end of the body is closed by a head 8 having a bearing for the rear end of the crank shaft and the forward end of the body is closed by a head 10 detachably secured in place and forming a chamber 9 between it and the wall 3, for a train of suitable timing gears 11 for transmitting motion from the forward end of the crank shaft to actuate a suitable cam for moving the tappet rods 13 which actuate the valves (not shown) of the cylinders.

The wall 3 carrying the bearing for the forward end of the crank shaft 7 is preferably detachably secured in place by means of bolts 14 passing through the wall and through a suitable inwardly extending flange on the body so that easy access may be had to the crank case of the engine by removing the head 10 which will disclose the cam shaft and timing gears and then by detaching the wall 3 and removing it endwise from the end of the crank shaft, said wall being provided with suitable bearings for the tappet rods. The head 10 is preferably formed with a screwthreaded flange 16 adapted to engage the screwthreaded forward end of the body and detachably hold the head in place.

Secured upon the rear end of the crank shaft 7 adjacent to the inner side of the rear head 8, is a fly wheel 17 which may be provided with a web or spokes in the form of fan blades if found desirable for drawing air through suitable openings in the head 8 and forcing it longitudinally through the body around a gasolene tank 18 which is fitted in the body just forward of the fly wheel and is formed with a tubular member 20 through which the crank shaft 7 extends, said tube being of greater diameter than the crank shaft to provide a space through which the air may pass from a fly wheel chamber 21 into a chamber 19 between the forward end of the tank and the wall 4. Within the chamber 19 is preferably placed a suitable carbureter 23 connected with the cylinders of the engine in the usual manner and this carbureter is arranged to draw air from the chamber 19 and to receive fuel from the tank 18 through a suitable pipe connection 24. The body 1 may be provided with a series of openings 22 for the admission of additional air to the chamber 19, and as shown in Fig. 5, the body 1 may be corrugated throughout that portion which forms the chambers 19, 21 and the chamber for the fuel tank 18 so that air may pass freely through these corrugations from the fly wheel chamber to the carbureter chamber all around the tank as well as through the tubular center 20.

Upon the extreme rear end of the crank shaft 7 is secured a small beveled pinion 25 in mesh with a beveled gear 26 on a transverse or counter shaft 27 mounted in suitable bearings upon a gear casing 28 which is secured to the rear head 8 of the body. A magneto 29 is shown as mounted upon the gear casing and is driven in any suitable manner as by a belt or chain 30 from the shaft 27.

The driving wheel 31 of the vehicle is driven in the usual manner by means of a sprocket chain 32 running over suitable sprockets on the shaft 27 and axle of the driving wheel. A suitable fork 33 embraces the wheel 31 and is pivotally attached at its upper end to the upper end of a post 34 having a forked lower end pivotally secured to a saddle or strap 36 on the body 1 at a short distance forwardly from its rear end. A seat 35 is carried by the upper end of the fork and post in the usual manner and the upper end of the fork is preferably provided with a sleeve member 37 to receive the upper end or stem of the fork and a spring 38 within the sleeve engages the stem of the fork and permits of a yielding motion in the direction of the length of the fork.

Pivotally attached at 39 to the sides of the body 1 at its rear end are two distance rods 40 which extend rearwardly and are provided with the usual forked ends to receive the driving wheel axle 41. Truss rods 42 are pivotally attached to the axle 41 at their rear ends and at their forward ends are pivotally connected to strut members each comprising a sleeve 43 pivotally secured to the side of the body 1 near the pivots 39, and a plunger member 44 to enter the sleeve against the action of a spring therein. The strut members are therefore adapted to yield in the direction of their length. Truss rods 46 are pivotally attached at their lower ends to the struts and secured in any suitable manner at their forward ends to the forward end of the body or head 10. A yieldable forked rear frame is thus provided for carrying the load upon the driving wheel, the strut members being adapted to yield under load, the frame swinging downwardly about the axis of the axle, and the weight of the rider being yieldingly supported by the spring 38, the post 34 being free to turn upon its pivotal connection with the strap 36 secured to the body 1.

47 indicates the front or steering wheel of the vehicle and this wheel is mounted within a suitable fork 50 provided with a head 48 having sliding engagement therewith with a spring 49 in the head to permit a yielding movement between the head and fork. To prevent side motion or lateral spring of the lower end of the fork 50, brace rods 51 extend from the lower end of the fork rearwardly and outwardly to the outer ends of a transverse shaft or bar 52 secured in any suitable manner to the head 10. The brace rods are so attached that they are free to turn relatively to the fork and to the transverse member and truss rods 53 provided with turn buckles 54 intermediate their ends are pivotally connected at their upper ends to the head 48 and at their lower ends to the transverse bar 52 at a short distance inwardly from the point at which the brace rods 51 are pivotally secured to said member. A frame member 55 is also pivotally attached at one end to the head 48 and at its opposite end to the body 1 by means of suitable ears 56 on the body at a short distance rearwardly from its forward end. A forked frame is thus provided for the steering wheel and this frame is pivotally attached to the body in such a manner as to allow for the yielding movement of the fork in the head and at the same time firmly braces the fork against lateral or rearward movement.

In this construction a very strong and light frame is provided which is arranged to yieldingly carry the load and the tubular body forms a rigid member of the frame structure to which the forked yielding frames for the driving and steering wheels are attached. This tubular body also forms a casing to inclose the several necessary engine adjuncts such as the gasolene tank and carbureter and the engine fly wheel, and at the same time forms the crank case of the engine and casing for the timing gears, thereby providing a complete power plant for the motor cycle. The particular arrangement of the fly wheel upon the rearwardly extended end of the crank shaft distributes the weight of the parts between the driving and steering wheels and by positioning the cylinders of the engine as described, they are at all times both exposed to the air to insure proper cooling. The transverse member 52 of the frame not only forms a place of attachment for the rods 51 but also forms a guard for the motor cylinders so that should the vehicle accidentally tip over this member will strike the ground and prevent injury to the motor.

Obviously changes may be made in the construction and arrangement of parts without departing from the spirit of my invention and I do not therefore limit myself to the construction shown.

Having thus fully described my invention what I claim is:—

1. In a machine of the character described, the combination of a tubular member, an engine cylinder secured to said member, an engine crank shaft in said member extending longitudinally thereof, closures for the ends of said member, walls having bearings for said shaft extending across within said member and separating the same into chambers one of which forms a crank case for the engine, and a fuel tank for said engine cylinder in another chamber of said member and surrounding said crank shaft.

2. In a machine of the character described, the combination of a frame comprising frame members and a tubular member to which the frame members are attached, an engine cylinder secured to said member, an engine crank shaft in said member extending longitudinally thereof, walls extending across the member and dividing the same into a plurality of chambers one of which forms an engine crank case, and air cooled means within one of said chambers for maintaining a fuel supply for said engine cylinder.

3. In a machine of the character described, the combination of a tubular member, an engine cylinder secured to said member, an engine crank shaft in said member extending longitudinally thereof, walls having bearings for said shaft and extending across within said member and dividing the same into a plurality of chambers one of which forms a crank case for the engine, means for detachably securing one of the walls within said member, whereby it may be removed longitudinally therefrom to give access to the crank chamber, and air cooled means in one of said chambers for maintaining a fuel supply for said engine cylinder.

4. In a machine of the character described, the combination of a frame comprising frame members and a tubular member to which the frame members are attached, an engine cylinder secured to the tubular member, a crank shaft within the tubular member and having the cranked portion thereof at one end of said member, bearings within the tubular member for the crank shaft, a fly wheel on the crank shaft at the opposite end of the tubular member from the cranked portion of said shaft, and means supported by the tubular member for transmitting motion from the crank shaft.

5. In a machine of the character described, the combination of a tubular member, an engine cylinder secured to the tubular member and extending laterally therefrom, a plurality of walls dividing the interior of the tubular member into a series of chambers, a crank shaft extending longitudinally of the member and supported by said walls with its cranks within one of the chambers, a fly wheel on the crank shaft within said member and a fuel tank within the member between the fly wheel and a wall of the chamber in which the cranks are located.

6. In a machine of the character described, the combination of an engine cylinder, a tubular member to which the cylinder is secured to extend laterally therefrom, said member forming a crank case for said cylinder, walls within said member dividing the same into a plurality of chambers, a crank shaft within said member supported by said walls with its cranks within one of the chambers, and an extended end portion projecting longitudinally of the tubular member through another chamber, a fly wheel on the extended end of the crank shaft within one of the chambers, a fuel tank surrounding the extended end of the crank shaft between said fly wheel and a wall of the chamber in which the cranks are located, there being a space between the end of said tank and said wall forming an air chamber, a carbureter arranged to draw air from the air chamber and receive fuel from the fuel tank, and means supported by the tubular member for transmitting motion from the extended end of the crank shaft.

7. In a machine of the character described, the combination of an extended tubular member, an engine cylinder secured to the side of said member near one end thereof, a crank shaft extending longitudinally within said tubular member and having cranks adjacent to the engine cylinder, and an extended end extending longitudinally through said member in the axis thereof, walls within said tubular member having bearings for the crank shaft and dividing said member into a plurality of chambers, a detachable closure for the end of the member adjacent to the engine cylinder, timing gears and valve cams for the engine supported by one of said walls adjacent to the detachable closure, a fly wheel within said tubular member upon the extended end of the crank shaft, a fuel tank within the tubular member, a carbureter within a chamber of the tubular member adapted to receive fuel from the fuel tank, and air from said chamber, bearings carried by the tubular member, and a jack shaft supported in said bearings and receiving motion from the extended end of the crank shaft.

8. In a machine of the character described, the combination with a driving wheel and front supporting wheel, and forked frames for said wheels, of a tubular member to which said forked frames are attached and which forms a connection between said forked frames, an engine cylinder secured to said tubular member, a crank shaft within the tubular member extending longitudinally thereof with its rear end adjacent to the driving wheel, and means supported by said tubular member for transmitting motion from the rear end of said crank shaft to the driving wheel.

9. In a machine of the character described, the combination with supporting wheels, of a frame supported by said wheels comprising frame members attached to each of the wheels, and a longitudinally extending tubular member to which the frame members are attached and forming a connection between said frame members, an engine cylinder secured to and extending laterally from said tubular member, walls within the tubular member extending across the same and forming a plurality of chambers, a crank shaft supported by said walls with its cranks in one of said chambers and an extended end projecting through the rear end of the tubular member, a fly wheel on the crank shaft within the tubular member adjacent to the rear end thereof, bearings carried by the rear end of the tubular member, a counter shaft in said bearings extending transversely of the extended end of the crank shaft to receive motion therefrom, and means for transmitting motion from the counter shaft.

10. In a machine of the character described, the combination of a rear driving wheel, a fork for said wheel, a front steering wheel, a steering fork for said wheel, a tubular member between said wheels, pivotal connections between said tubular member and said forks, an engine cylinder secured to the tubular member near the forward end thereof, a crank shaft in the axis of the tubular member extending longitudinally thereof with an extended end projecting through the rear end of the tubular member, a fly wheel on the crank shaft within the tubular member near the rear end thereof, walls extending across the tubular member and provided with bearings for the crank shaft, said walls forming a chamber for the cranks of the crank shaft and an air chamber adjacent thereto, a carbureter in the air chamber to draw air therefrom, bearings on the rear end of the tubular member, a countershaft supported in said bearings and extending transversely of the crank shaft, gears for transmitting motion from the crank shaft to the countershaft, a casing inclosing said gears, and means for transmitting motion from the end of the countershaft to the rear driving wheel.

11. In a machine of the character described, the combination with a rear driving wheel, and a fork therefor, and a front steering wheel and steering fork, of a tubular member extending longitudinally between the wheels and forming a main member of a supporting frame, a post pivotally attached to said tubular member and to the fork for the rear wheel, laterally extending studs on the tubular member, frame members pivotally attached to said studs and extending rearwardly to the fork of the rear wheel, truss rods, and a yieldable strut between said rods and said studs.

12. In a machine of the character described, the combination with a rear driving wheel and a forked frame, a front steering wheel and a steering fork, of a longitudinally extending tubular member between the wheels to which the forked frame for the rear wheel is attached, engine cylinders secured to the sides of the tubular member adjacent to the forward end thereof, said member forming a crank case for said cylinders, a frame member secured to the forward end of the tubular member and extending transversely thereof adjacent to the engine cylinders and projecting beyond the same, brace members attached to said transverse member at one end and connected to the steering fork at their opposite ends, and means carried by the rear end of the tubular member for transmitting motion from the engine.

13. In a motor cycle, supporting wheels, a power plant in the longitudinal axis of said wheels, and a transverse member on the forward end of said power plant serving as a guard therefor.

14. In a motor cycle, supporting wheels, a power plant supported from said wheels and having laterally projecting engine cylinders, and a transverse guard member on said power plant and extending beyond the ends of the engine cylinders thereof.

15. In a motor cycle, supporting wheels, a power plant for driving one of said wheels, a member at the forward end of said power plant, truss rods between said member and the driven supporting wheel, and means yieldably connecting said truss rods to the rear end of said power plant.

16. In a motor cycle, forks, supporting wheels therefor, a power plant between said wheels, a transverse guard member at the forward end of said power plant, truss rods between said forks and connected to said transverse guard member, and means for yieldably connecting some of said truss rods to the rear end of said power plant.

17. In a motor cycle, forks, supporting wheels therefor, a power plant between said wheels and having laterally extending engine cylinders, a guard member supported by said power plant and projecting beyond the ends of the cylinders thereof, brace rods connecting the ends of said member to one of said forks and truss rods connecting said member to the other of said forks and yieldably supporting an end of said power plant.

In testimony whereof I affix my signature in presence of two witnesses.

JOSHUA A. HILL.

Witnesses:
 ANNA M. DORR,
 LEWIS E. FLANDERS.

Copies of this patent may be obtained for five cents each, by addressing the "Commissioner of Patents, Washington, D. C."